United States Patent [19]

McAlpine et al.

[11] 3,741,365
[45] June 26, 1973

[54] TRANSFER MECHANISM FOR BATTERY GRIDS

[75] Inventors: Charles H. McAlpine, Coloma; Kenneth G. McGowan, Lawrence, both of Mich.

[73] Assignee: Mac Engineering & Equipment Co., Benton Harbor, Mich.

[22] Filed: Apr. 10, 1972

[21] Appl. No.: 242,616

[52] U.S. Cl. ................................................. 198/27
[51] Int. Cl. ............................................ B65g 47/00
[58] Field of Search ................................. 198/24, 27

[56] References Cited
UNITED STATES PATENTS
3,198,669   8/1965   Pickering et al. ................. 198/27 X Primary Examiner—Evon C. Blunk
Assistant Examiner—Hadd Lane
Attorney—D. Henry Stoltenberg

[57] ABSTRACT

A device is disclosed for handling grids or plates for storage batteries on a production line which transfers and spaces double grids connected together at their bottom edges hung by outwardly-extended connector lugs on an advancing chain conveyor for feeding the grids to a second chain conveyor or other device to another machine such as a pasting machine. The transfer device compensates for bent or deformed connector lugs which could jam the device to maintain steady and uniform feeding and transfer of the double grids at spaced intervals.

3 Claims, 12 Drawing Figures

PATENTED JUN 26 1973 3,741,365
SHEET 3 OF 3
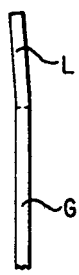
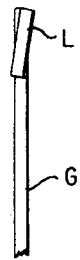
Fig. 7   Fig. 8   Fig. 9   Fig. 10
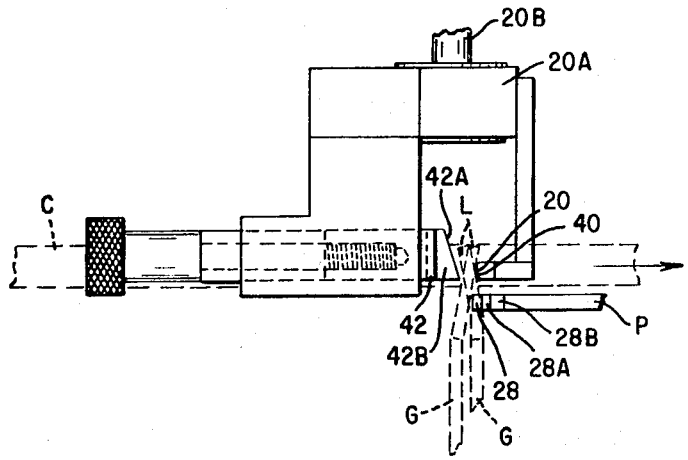
Fig. 11
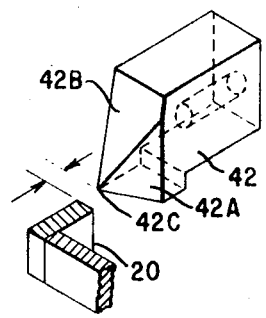
Fig. 12

TRANSFER MECHANISM FOR BATTERY GRIDS

On a mass production line for the fabrication of storage battery plates, a problem arises with reference to the handling of deformed double plates or grids on conveyor chains particularly at points of transfer where the plates or grids must be transferred and spaced at predetermined intervals on another conveyor chain or device preparatory to the performance of a fabricating step by another machine such as the pasting of a grid or the like. A deformed plate or grid can easily jam a chain conveyor whether such deformation is a major bending of the whole plate or grid or only a slight deformation in the alignment of one or more lugs of the plates or grids from a perfect theoretical planar condition which is most desirable condition. The present invention contemplates the provision of a device which will compensate for minor variations in the condition of the plates or grids so that jamming of the chain conveyor at transfer points is obviated to prevent shutdown of the production line and allow the plates or grids to be conveyed and transferred from one conveyor chain to another with facility and speed even though there may be considerable variation in the planar condition of the lugs of the plates or grids.

It is therefore a principal object of this invention to provide a means for compensating for variations of plates or grids on conveyors on a production line which will facilitate transfer from one conveyor to another with suitable spacing without jamming.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

FIGS. 7 and 8 are plan views showing two deformed conditions of the lugs of the double grids, FIGS. 9 and 10 are elevational views also showing deformed conditions of the lugs, which relate to FIGS. 3-6, FIG. 11 is a plan view of a portion of the operative elements of the device under different condition of deformation of the lugs of the double grids shown in FIGS. 7 and 8, and FIG. 12 is an isometric view of a portion of the device in inverted position to show a detail of construction.

Figures 1, 2:
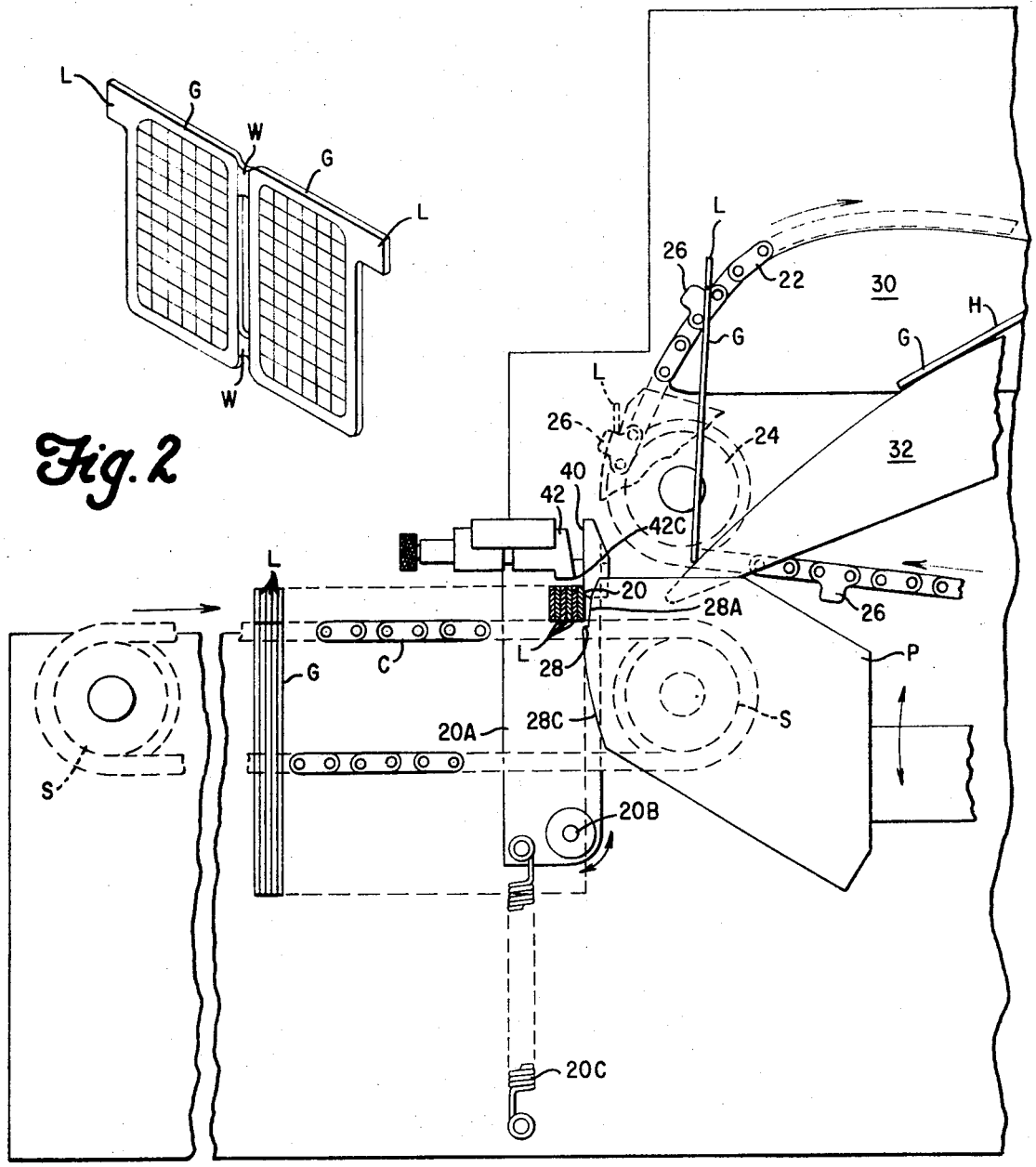
FIG. 1 is an elevational view partly in section of a transfer and feeding device incorporating the invention.
FIG. 2 is an isometric view of a double grid as used with the device shown in FIG. 1, FIGS. 3-6 are enlarged elevational views of a portion of the operative elements of the device under different conditions of deformation of the grid lugs.

On a mass production line for the production of battery plates, the grids G as shown in FIG. 2 are molded as doubles, each grid having an outwardly-extended lug L, while the bottoms of the grids G are connected together by webs W so that the lugs L, extending outwardly in opposite directions at the upper edges of the grids, form a convenient means to hang the double grids on parallel conveyor chains moving together at uniform speeds as shown in FIG. 1. The conveyor chains C are mounted on and driven by sprockets S in the well known manner, with the upper chain portion moving to the right of FIG. 1, with the lugs L of the individual grids G being hung thereon to be suspended as shown. The frictional engagement between the chains C (only one being shown) and the lugs L, advance the grids to the right until they engage gap stops 20 which move backward under a spring bias where they will be held relatively stationary at a fixed point with the chains continuing their movement as will be described further hereinafter. At this point the grids are to be transferred to a second chain conveyor 22 positional above and to the right of the first chain conveyor C.

The upper conveyor chains 22 (only one shown) are driven by sprockets 24 so that the upper portions thereof advance to the right of FIG. 1 to another machine (not shown) such as a pasting machine or the like. Dogs 26 are positioned in spaced relation on the chains 22 and move in timed relation with a pair of horizontal pivotally-mounted pick-up arms P (only one shown) which have notches 28 on their forward faces the notches being flanked by substantially concentric upper and lower faces 28A and 28C so that both lugs L on a double grid G are simultaneously contacted and interlocked with the arms to carry the double grid upwardly through an arc by the pivotal movement of arm P to a position shown in phantom in FIG. 1. At this point the double grid is held momentarily while it is being picked up by dogs 26 on the chains 22 to perform the transfer operation for the double grids. The chains dogs 26 are moved through an upward extending arc determined by the curvature of arcuate plate 30, and as the double grid moves to the right in FIG. 1, its bottom edge contacts another arcuate plate 32 positioned centrally between the conveyor chains 22 whereby the double grid is moved to a horizontal position as shown at H to move to another processing machine (not shown).

The present invention is concerned with the control of the contactual relation between the notches 28 on the arms P and the lugs L of the double grid G, whereby jamming of the conveyors is obviated when badly deformed grids G with deflected lugs L are advanced into contact with the gap stops 20 and upper face 28A cooperating with each of the chains C of the lower or first conveyor. The deflected condition of the deformed lugs L is shown in FIG. 7-10, wherein FIGS. 7 and 8 are plan views looking at the grid from its top side, while FIGS. 9 and 10 are views from the side of the grid. Each shows a different deflected condition for the lugs L possible in a series of grids as passing through the transfer between the upper and lower conveyors. Each could give rise to a jammed condition of the transfer device in conveyors known in the prior art.

Figure 3:
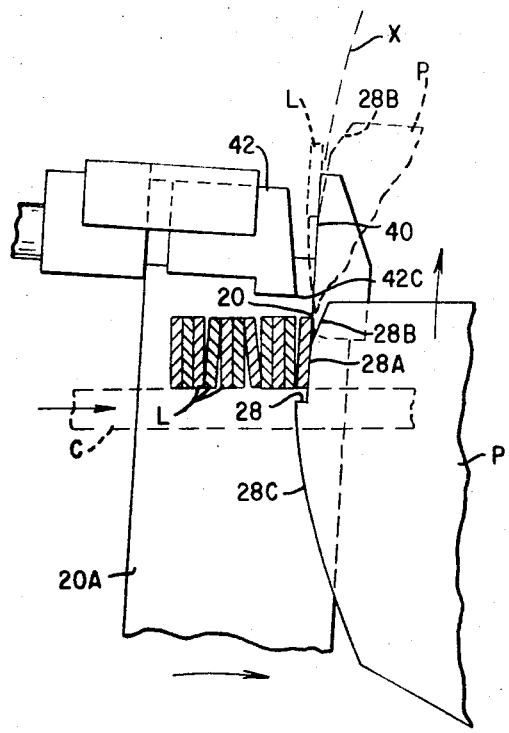
Figure 4:
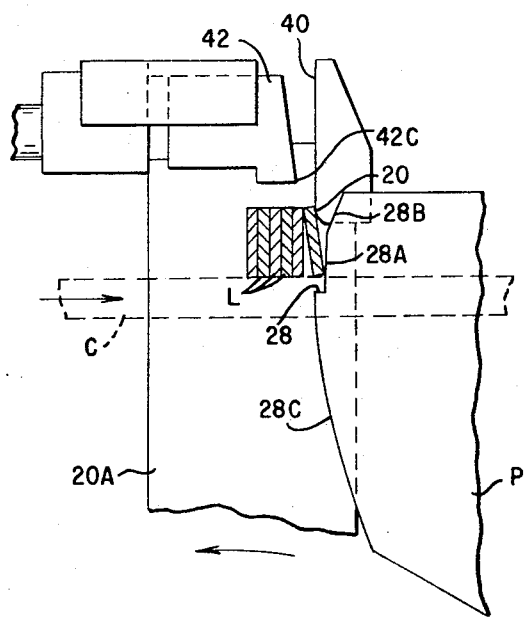
Figure 5:
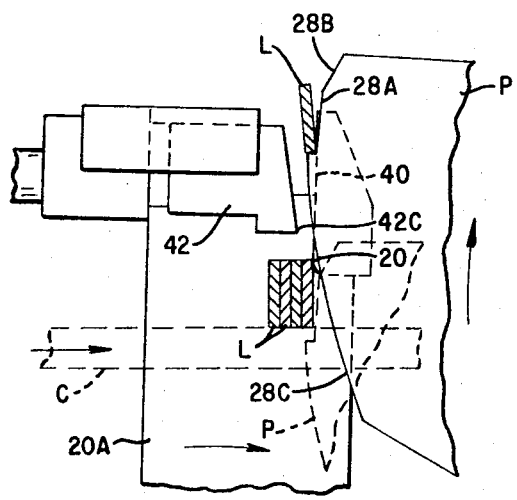

The deflected condition of the lug L as shown in FIG. 10 is shown in its relation of the transfer device in FIG. 3 while the deflected condition of the lug L shown in FIG. 9 is shown in its relation to the transfer device in FIG. 4. It will be noted that stop 20 in both FIGS. 3 and 4 contacts the upper portion of the lugs L, which as shown in FIG. 3 is deflected to the right from normal position while in FIG. 4 it's deflected to the left, which is compensated by the varying positions of the stop 20, made possible by its pivotal mounting on vertical plate 20A, movable about pivot pin 20B (FIG. 1). A spring 20C is provided to bias the plate or arm 20A for counter clockwise movement against the frictional force applied by the slipping of the lugs on the conveyor chains in the opposite direction. Suitable stops can be provided to limit the pivotal movement of the plate 20A in either direction. A pivotal vertical plate or arm 20A is provided on each side to cooperate with each of the oppositely-extending lugs L on the double grid G, so that compensation will be made for each of the deflected lug conditions shown in FIGS. 7 – 10 as will appear hereinafter.

Figure 6:
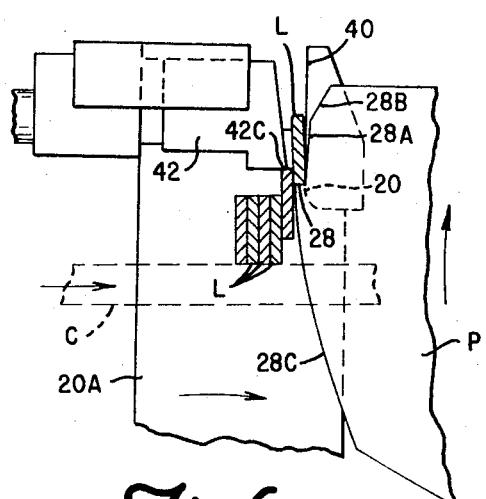

The stop 20 has an upwardly-extending planar face 40 which cooperates in spaced relation with adjustable stop block 42 also mounted on plate or arm 20A by a gap through which lugs L are adapted to move upwardly when engaged by notch 28 on arm P during the transfer motion from the lower conveyor to the upper conveyor as already described. The notch 28 is in size about three-fourths of the thickness of the lugs, while the gap is dimensioned to about one and one half times the thickness of the lugs so that two lugs on succeeding grids sticking together may not pass through the gap as shown in FIG. 6. The adjustable mechanism for the block 42 allows manipulation to allow the use of grids having lugs of greater or lesser thickness. Mechanisms of this kind are well known and need not be described in further detail.

The pivotal arm P on the forward face of which the notch 28 is located swings through a fixed arcuate path X shown in FIG. 3 so that no difficulty is encountered during engagement of the notch 28 with the bottom edge of the lug L preparatory to the transfer operation to the upper conveyor consisting of chains 22. The notch 28 terminates in a vertical face 28A against which the lugs L abut by their frictional engagement with moving conveyor chains C as already described. The vertical face 28A is given a receding oblique cut at 28B to prevent interference with the lug L under the deflected lug conditions shown in FIGS. 10 and 3. Below the notch 28 the arm P is given a receding arcuate face 28C which is concentric with the main pivot for the arm (not shown) and also the arcuate path X of the notch 28 which will cooperate with the lugs L of the next succeeding grid G to prevent undue interference therebetween when the arm P is moving up and down during a complete transfer operation to the upper conveyor.

Referring now to FIG. 11 which is a plan view, the relation between the stop 20 and the spaced block 42 is shown whereby compensation can be made for lug deformation as shown in the 7 and 8 as shown in phantom. The lug L on the right side in engagement with notch 28 and also in engagement with stop 20 is similar in deformation to that shown in FIG. 7 and is in position for transfer to the upper conveyor. It will be noted that adjustable block 42 has an oblique rear face 42A which provides additional clearance for the deformed lug with reference to the stop 20. This is clearly shown in FIG. 12 where a second oblique face 42B is shown whereby a projecting point 42C is the principal element which establishes establishes gap with the stop 20 already described hereinbefore.

In FIG. 11 the leftmost lug L is ready to be moved into operative relation with the notch 28 as soon as the rightmost lug L is moved up for the transfer operation. Here the stop 20 must be moved to the right about the pivot 20B before the lug L can engage the notch 28 preparatory to the transfer operation by the arm P. From this, it is apparent that a compensating means for the transfer mechanism is provided which acts independently for each lug L of the double grids G to compensate for the separate and often different deformations met in a series of grids G as presented to the device by the first conveyor to allow transfer to the second conveyor without jamming or faults.

We claim:

1. In a transfer device for double battery grids or plates with outwardly-extending lugs to suspend and transfer the double grids from one double-chain conveyor to a second double-chain conveyor or device positioned above the first conveyor, a pair of horizontal rotable arms movable together through a predetermined arc provided with parallel plates having upper and lower forward faces substantially concentric with the pivot for the rotable arms, separated by notches dimensioned to be less than the thickness dimension of the lugs with which the notches interlock during the transfer operation from the lower to the upper conveyor or device, a second pair of vertical rotable arms mounted exteriorly of the first pair of horizontal arms in a cooperative relation with each other and with the outwardly-extending lugs of the double grids, stops on the second vertical pair of arms to contact the forward faces of the lugs as advanced by the first conveyor, to move the vertical arms until the forward faces of the lugs contact the upper forward face of the first pair of horizontal arms above the notches, adjustable blocks in spaced relation to the stops on the second vertical pair of arms to cooperate therewith above the lugs to allow passage of a single lug during transfer movement of the grids by the arcuate movement of the first pair of horizontal arms, and means on the second conveyor or device to pick up the lugs on the grids or plates at the upper end of their arcuate movement by the first pair of horizontal arms to remove the lugs from their engagement with the notches thereon.

2. The device defined in claim 1 further characterized by the adjustable blocks being cut with oblique faces to present a point at the cooperative portion with the stops on the second vertical pair of arms.

3. The device defined in claim 1 further characterized by a spring bias for the second pair of vertical arms to oppose the movement of the grids by the first conveyor when contact by the lugs obtains with stops.

* * * * *